(12) United States Patent
Profanchik, Sr.

(10) Patent No.: US 8,315,367 B2
(45) Date of Patent: Nov. 20, 2012

(54) SYSTEMS AND METHODS FOR RFID-BASED ACCESS MANAGEMENT OF ELECTRONIC DEVICES

(76) Inventor: John D. Profanchik, Sr., Plano, TX (US)

(*) Notice: Subject to any disclaimer, the term of this patent is extended or adjusted under 35 U.S.C. 154(b) by 29 days.

(21) Appl. No.: 13/113,892

(22) Filed: May 23, 2011

(65) Prior Publication Data

US 2011/0221579 A1 Sep. 15, 2011

Related U.S. Application Data

(63) Continuation of application No. 11/870,157, filed on Oct. 10, 2007, now Pat. No. 7,953,216.

(60) Provisional application No. 60/916,166, filed on May 4, 2007.

(51) Int. Cl.
*H04M 3/42* (2006.01)
*H04M 11/00* (2006.01)
*H04M 11/04* (2006.01)
*H04M 3/00* (2006.01)

(52) U.S. Cl. .......... 379/207.02; 379/93.03; 379/38; 379/188; 340/572.2; 340/539.13; 340/5.2; 340/870.01; 340/539.1

(58) Field of Classification Search ........... 379/207.02, 379/93.03, 38, 188; 340/572.2, 539.13, 5.2, 340/870, 539.11
See application file for complete search history.

(56) References Cited

U.S. PATENT DOCUMENTS

| | | | |
|---|---|---|---|
| 7,102,509 B1* | 9/2006 | Anders et al. | 340/539.13 |
| 2004/0029564 A1* | 2/2004 | Hodge | 455/411 |
| 2007/0047734 A1* | 3/2007 | Frost | 379/422 |

* cited by examiner

*Primary Examiner* — Vivian Chin
*Assistant Examiner* — Paul Kim
(74) *Attorney, Agent, or Firm* — Baker & McKenzie LLP

(57) ABSTRACT

Disclosed are systems and methods for preventing unauthorized persons from using an electronic device within a facility. In such an embodiment, the system may include a RFID tag having unique identification information associated with a wearer of the RFID tag. The RFID tag may be comprised in a non-removable item worn by the wearer, such as a bracelet. This system may also include an RFID reader associated with the electronic device and having an RFID coverage zone for detecting RFID tags within the coverage zone. A device management system may be connected to the reader and configured to determine whether a wearer in the coverage zone is authorized to use the electronic device based at least in part on detected RFID tag's unique identification information. In such an embodiment, the device management system is configured to activate the electronic device if it determines the authorized wearer is detected in the coverage zone.

20 Claims, 3 Drawing Sheets

SYSTEMS AND METHODS FOR RFID-BASED ACCESS MANAGEMENT OF ELECTRONIC DEVICES

CROSS-REFERENCE TO RELATED APPLICATIONS

This disclosure claims the benefit of Provisional Patent Application Ser. No. 60/916,166, filed May 4, 2007, entitled "SYSTEM AND METHOD FOR RFID-BASED TELEPHONE MANAGEMENT," and is a continuation of Utility Patent Application Ser. No. 11/870,157, filed Oct. 10, 2007, entitled "SYSTEMS AND METHODS FOR RFID-BASED ACCESS MANAGEMENT OF ELECTRONIC DEVICES," both of which are incorporated herein by reference in their entirety.

TECHNICAL FIELD

The present invention relates generally to the field of telephone and communication systems in penal institutions or other campus based facilities. In particular, this invention enhances investigation abilities to positively identify a telephone user and other persons near enough to the telephone user to overhear the telephone user or interact with the telephone. Further, this invention provides rule processing to determine whether a telephone call can continue and provide a disconnect signal to an integrated or stand alone inmate call management system.

BACKGROUND

Generally, the need to monitor, control, record and provide detailed records of the usage of a telephone system in a penal institution is well recognized. To prevent such institutions from incurring unaccountable telephone costs, the institutions must either restrict access to outbound telephone lines or employ a inmate call management system to charge the called party for the communication costs. Without constraints on an inmate's use of the telephone system, inmates may harass outside parties or individuals or other unwanted inmate activities. An inmate should generally be prevented from placing a telephone call to the prosecutor who prosecuted the inmate's case, the victim of the inmate's crime, or witnesses from the inmate's case. It is also desirable to prevent inmate use of penal institution call systems to perpetrate additional criminal activities such as fraud, illegal drug sales, and other criminal conspiracies.

To prevent a penal institution from incurring unaccountable phone costs and also to prevent improper use of the telephones in the institution, it is critical that an inmate call management system identify the specific parties that participate in the telephone calls. A penal institution should use a communication system that provides an accurate identification means for administrators to determine the individual responsible for each outbound telephone call, and anyone else in the facility or institution that may have participated in the phone call. The system should include a means for restricting access to particular inmates.

It is common practice in a penal institution to assign each inmate a personal identification number (PIN). When an inmate uses the telephone in the facility, the inmate typically must supply this PIN to gain access to the telephone system. This PIN is entered by pressing digits on the phone keypad. A less common alternative is the use of biometric devices to identify the inmate to the inmate call management system. These biometric devices may use voice print or finger print analysis to determine the identity of the caller. These devices and techniques have limited usefulness because they may be easily circumvented. One inmate may coerce another inmate to provide voice print, finger print, or their PIN so that they can make improper or unmonitored phone calls.

In view of the foregoing, there is a clear need for additional controls to identify the inmate party to a telephone conversation for the inmate call management system. The additional controls should support existing call management systems to provide positive identification of the inmate party and possibly other inmates that were a party to a telephone conversation.

SUMMARY

Disclosed is a radio frequency identification (RFID) system that identifies prison inmates during their use of the telephone in a controlled environment, and determines whether the phone call can continue to proceed based on the proximity of one or more inmates to the telephone. The system performs a constant check of any proximate RFID during the inmate call to ensure a set of rules governing phone use are followed. For example, a rule can be processed that ensures the inmate who initiated the call remains on the phone for the duration of the call. The system performs a constant check of any RFID in range of the telephone during the inmate call to ensure that another inmate does not join, interfere, or take over the call from the inmate who originated the call. Detection of an improper or otherwise unauthorized RFID, i.e., from an unauthorized inmate, can cause the immediate termination of the telephone call. The present invention can be used as an add-on to legacy inmate call management systems or incorporated internally into an inmate call management system. The system will also provide a way to control the call and record the RFID of inmates near enough to the phone to participate in the call.

In one embodiment, a system is provided for preventing an unauthorized person from using an electronic device within a facility. In such an embodiment, the system may include a RFID tag having unique identification information associated with a wearer of the RFID tag. The RFID tag may be comprised in a non-removable item worn by the wearer, such as a bracelet. This system may also include a reader associated with the electronic device and having an RFID coverage zone for detecting RFID tags within the coverage zone. A device management system may be connected to the reader and configured to determine whether wearers in the coverage zone are authorized to use the electronic device based at least in part on a detected RFID tag's unique identification information. In such an embodiment, the device management system is configured to activate the electronic device if it determines an authorized wearer is detected in the coverage zone.

In another embodiment, a system for preventing unauthorized persons from influencing the use of a telephonic device in a custodial facility includes a first RFID tag having first unique identification information associated with a first wearer of the RFID tag, and a second RFID tag having second unique identification information associated with a second wearer of the RFID tag. Such a system may also include a reader associated with the telephonic device and having an RFID coverage zone for detecting RFID tags within the coverage zone. A call management system connected to the reader may be configured to determine whether a wearer is authorized to use the telephonic device based at least in part on an RFID tag's detected unique identification information. In addition, in such an embodiment, the reader is configured to detect when the first RFID is within the coverage zone, and thus the call management system activates the telephonic device if it determines the first wearer is authorized to use the telephonic device. Moreover, the reader is further configured to detect when the second RFID is within the coverage zone while an authorized first wearer is within the coverage zone, and thus the call management system deactivates the telephonic device if it determines the second wearer is not authorized to use the telephonic device.

In yet another embodiment, a system is provided for preventing unauthorized persons from using an electronic device within a facility. In such an embodiment, the system may include a plurality of RFID tags each having unique identification information associated with a wearer of one of the RFID tags. This system may also include a reader associated with the electronic device and having an RFID coverage zone for detecting RFID tags within the coverage zone. A device management system may be connected to the reader and configured to determine whether wearers in the coverage zone are authorized to use the electronic device based at least in part on detected RFID tags' unique identification information. In such an embodiment, the device management system is configured to activate the electronic device if it determines only authorized wearers are detected in the coverage zone, and to deactivate the electronic device if it determines an unauthorized wearer is detected in the coverage zone.

In yet another embodiment, a method of preventing unauthorized persons from influencing the use of a telephonic device in a custodial facility may be provided. In such an embodiment, the method may comprise providing a first RFID tag having first unique identification information associated with a first wearer of the RFID tag, and providing a second RFID tag having second unique identification information associated with a second wearer of the RFID tag. Such a method may also provide for creating an RFID coverage zone around the telephonic device, detecting when the first RFID tag is within the coverage zone, and determining whether the first wearer is authorized to use the telephonic device based at least in part on the detected first unique identification information. In addition, the method may include activating the telephonic device for use by the first wearer if it is determined that the first wearer is authorized to use the telephonic device. Also, the method may include detecting when the second RFID tag is within the coverage zone while the first RFID is in the coverage zone, and determining whether the second wearer is authorized to use the telephonic device based at least in part on the detected second unique identification information. The method may then provide for deactivating the telephonic device if it is determined that the second wearer is not authorized to use the telephonic device.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

In view of the above, for a more complete understanding of the present invention, reference is now made to the following drawings in which.

DETAILED DESCRIPTION

Figure 1:
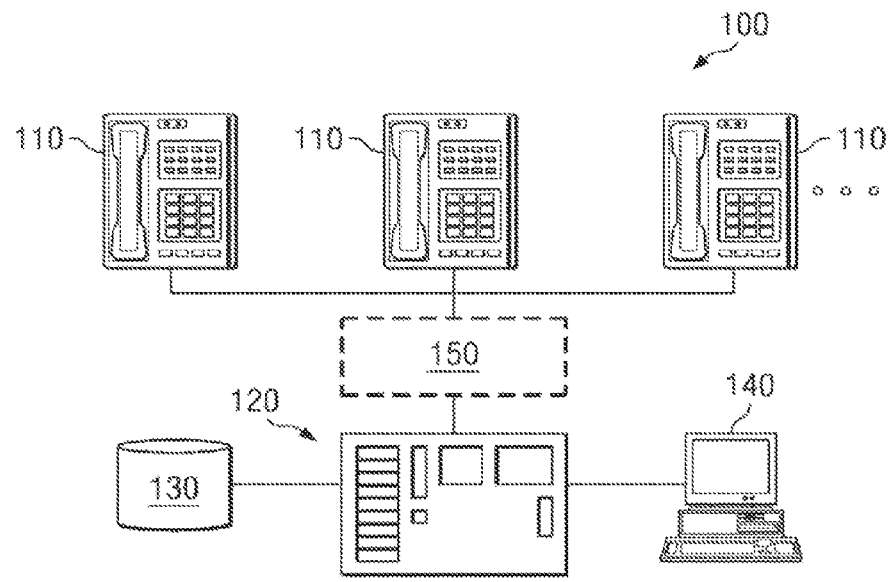
FIG. 1 illustrates one embodiment of radio frequency identification-based management system constructed according to the disclosed principles.

An radio frequency identification (RFID)-based management system 100 constructed according to the disclosed principles is illustrated in FIG. 1. The illustrated RFID system 100 in this embodiment involves the management of the use of telephones 110. The telephone units 110 are integrated with a call management system 120 in accordance with the disclosed principles.

RFID Readers (not illustrated) integrated in the telephones 110 are configured to detect RFID tags that pass within a predetermined RF coverage zone. Each RFID Tag used with the system 100 includes identification information unique to each tag, which in turn is unique to each wearer of a tag. If a tag is detected in the coverage zone of a reader in a telephone 110, the reader reads the unique identification information and transmit that information back to the call management system 120.

The call management system 120 can then access a database 130 storing rules and policies associated with each tag wearer and cataloged according to the identification information. Based on the rules and policies for each individual wearer, the call management system 120 determines if the wearer(s) of the detected RFID tag(s) is authorized to use one of the telephones 110. If wearer/tag within the coverage zone is so authorized, the call management system 120 will activate that telephone for use. However, if wearer/tag within the coverage zone is not so authorized, the call management system 120 will deactivate that telephone to prevent its potential use by a wearer prohibited from using a telephone 110.

An administrative terminal 140 can access the call management system 120 and the database 130, perhaps via a local area data network (LAN). The administrative terminal 140 may contain software that provides the administrative capability to define rules and policies on how phones may be used by one or more wearers of the RFID tags. The administrative terminal 140 may also contain the logic that enforces those rules and delivers a disconnect signal to the call management system 120, rather than the call management system 120 directly deactivating a telephone 110. In addition, the administrative terminal 140 may be used by custodians of the facility were the system 100 is installed to monitor the operation of the overall system 100, determine if any problems exist with the system 100, and even provide for an override of the call management system 120 for any reason, if needed.

It should be noted that the principles disclosed herein are in no way limited to the monitoring of telephone use by wearers of an RFID tag. For example, the telephones 110 may be other types of devices, such as televisions, computer terminals, radios, or even simply the access through a door into or out of a secure area within the facility. If the devices are televisions or radios, the management system 120 may be used to restrict access to the televisions or radios to, for example, inmates in a prison or even children within their homes. If the devices are computer terminals, access may be restricted to only certain authorized workers in an office building. If the devices are access points to secure areas, the management system 120 may be implemented to restrict access to such area(s) to only expressly authorized personnel. In short, an RFID-based management system constructed according to the disclosed principles may be beneficially implemented in any location where restricting access to a device or specific place with the facility is desired.

Figure 2:
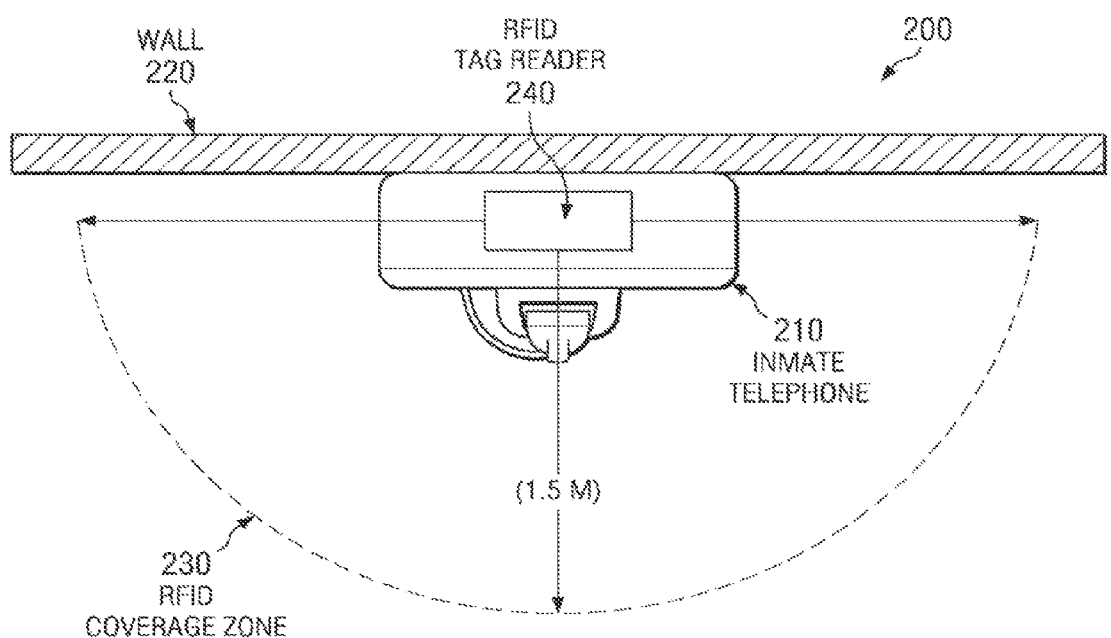
FIG. 2 illustrates one embodiment of a portion of an RFID-based management system similar to the system illustrated in FIG. 1.

FIG. 2 illustrates a portion of an RFID-based management system 200 similar to the system 100 illustrated in FIG. 1. Specifically, the management system 200 in FIG. 2 is being implemented in a correctional facility, such as a penal institution, to manage inmate access to telephones within the penal institution. To this end, the system 200 is used to positively identify the inmate parties to a telephone call from a penal institution.

The penal institution will issue an inmate identification RFID tag to each inmate. Unique information identifying the inmate wearer of a specific RFID tag will be registered with an inmate call management system (ICMS), such as the call management system 120 illustrated in FIG. 1. These RFID tags would typically be constructed such that they cannot be removed and are tamperproof. An example of such an RFID tag device could be a tamperproof bracelet worn by each inmate. Such an embodiment is discussed in greater detail with reference to FIG. 4. Another example could embed the RFID tag in some other article of clothing assigned to the inmate. In uses outside of a penal institution, the RFID tag may be embedded in a badge, access card, etc. assigned to persons within the facility.

The system 200 illustrated in FIG. 2 includes an inmate telephone 210, perhaps mounted on a wall 220. An RFID coverage zone 230 is generated around the telephone 210 by an RFID reader 240 integrated within the telephone 210. In this specific embodiment, mounting the telephone 210 on the wall 220 may assist in preventing tampering with the RFID reader 240 therein, helping ensure the RFID-based management system 200 is not circumvented.

The RFID reader 240 may be manufactured and powered so that both the telephone 210 and RFID reader 240 draw power from the existing two-wire telephone cable. The existing two-wire interface could also provide data communications capability to the call management controller and an administrative terminal (which may be a phone controller in this embodiment). The RFID reader 240 would detect RFID tags that enter the predetermined RFID coverage zone 230 generated around the telephone 210. In one example the coverage zone 230 may be about 1.5 m, however, any size coverage zone 230 is envisioned. For example, the RFID reader 240 may be capable of reading RFID tags within a maximum range of 30 feet or longer, but alternatively, shorter distances may be desired in some applications.

In use, each RFID tag will identify its inmate wearer to the call management system by means of the RFID signal that is detected by the RFID reader 240 in the telephone. The system 200 may be implemented so that only one inmate is allowed in proximity of the telephone 210. In addition, the inmate that is in proximity of the telephone 210 has been authorized to use the telephone 210, verified via the electronic identity of the inmate using the unique identification information of the RFID tag that inmate is wearing. Accordingly, if the inmate proximate to the telephone 210 is not authorized to use the telephone at that time, the call management system may immediately deactivate the telephone 210 so the inmate cannot use it. An inmate may not be authorized to use the telephone 210 for any reason, such as misbehavior or lack of sufficient funds in the inmate's personal expense account. In addition, even if the inmate is authorized to use the telephone 210 and is in the process of doing so, if another RFID tag enters within the coverage zone 230, the RFID reader 240 will detect that second tag and transmit its unique information back to the call management system. Once the identity of the inmate wearing that second RFID tag is verified, it is determined whether that inmate is authorized to use the telephone 210 at that time. If not so authorized, the telephone 210 can be immediately deactivated so no outgoing calls are continued or made.

Thus, an RFID-based call management system according to the disclosed principles may be used to ensure that only authorized inmates may approach and use a telephone 210, or other device if the system is implemented with other electronic devices. In addition, the system may be configured such that only one inmate is in the RFID coverage zone 230 during the start, duration and termination of a telephone call, even if other inmates detected within the coverage zone 230 would be authorized to use the telephone 210 on their own. Any such violations would result in the immediate disconnect of the in-progress call.

Such an implementation would help prevent situations where one inmate is passing improper information to an inmate using the telephone 210. For example, inmates often huddle around a telephone and whisper information to an inmate using the telephone 210 so that he may in turn pass that information to the person on the other end of the telephone call. It could be that the inmate passing information is not himself authorized to use a telephone 210, perhaps because he has been previously found to be orchestrating criminal activity from with the prison and his telephone privileges thereby revoked. Such inmates often use another inmate to pass on information to the outside world in order to continue orchestrating criminal behavior outside the prison. This situation could be curtailed by enlarging the RFID coverage zone 230 to a size that would prevent the secret passing of information to the inmate using the telephone 210. Since speaking loudly, hand signals, or other overt means of communication would then be needed to communicate information to the inmate on the telephone 210, guards monitoring the area could more easily detect the unauthorized passing of information.

In sum, an access management system constructed and implemented in accordance with the disclosed principles provides an RFID reader for obtaining secure identification and storage of RFID tag information obtained from a non-removable RFID tag element worn by each individual inmate. The stored unique identification information may be periodically or on a demand basis transferred to application software in the administrative terminal 140 that is an integral part of the inmate telephone complex. As a result, the system enables a positive identification of the inmate actually using the telephone (or other electronic) device, as well as a guarantee that only one inmate is in an allowed within the proximity of the telephone, if desired. Application software that assists in accomplishing these benefits may also be interfaced with a Jail Management System to permanently associate an inmate's ID number (or other unique identification information) with the inmate at the time of intake (or booking) in the correctional facility. Moreover, the identification information may be kept in perpetuity, so that if the inmate is released and sent to same correctional facility again at a later date, his/her unique number may be reprogrammed into one of the programmable RFID tags at that time.

Figure 3:
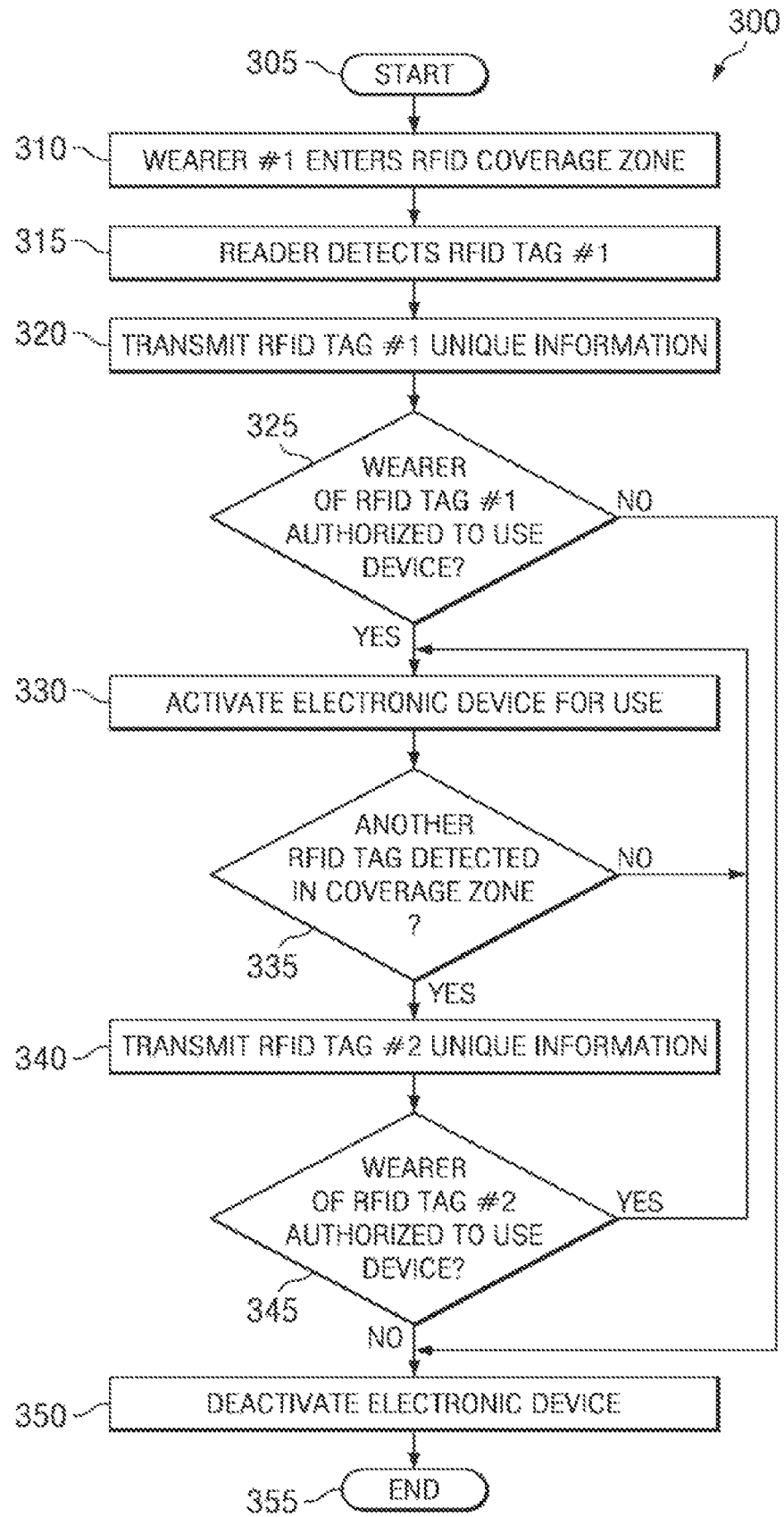
FIG. 3 illustrates one embodiment of a flow diagram of one embodiment of a process by which an RFID-based access management system may be used to ensure only authorized persons may use an electronic device.

FIG. 3 illustrates a flow diagram 300 of one embodiment of a process by which an RFID-based access management system may be used to ensure only authorized persons may use an electronic device. The process begins at a start block 305, where persons within the monitored facility are each assigned RFID tags having identification information unique to each individual. In addition, any equipment used in the access management system, such as RFID readers associated with the electronic devices and a device management system controlling access to the devices, may be initialized. In this example, the electronic devices may be telephones, televisions, radios, computer terminals or any other device that may be used by one or more authorized persons.

In block 310, a first wearer of an RFID tag enters the RFID coverage zone. The RFID tag is therefore detected by an RFID reader associated with the electronic device, at block 315. At block 320, the reader transmits the detected unique identification information pulled from the RFID tag back to the device management system. Once received by the device management system, the device management system determines, at decision block 325 whether the wearer of the detected RFID tag is authorized to use the electronic device. If the wearer detected by the reader is not authorized to use the device, the process moves to bock 350 where the device is deactivated or otherwise prevented from operating for the detected wearer. The process would then end at block 355, until another wearer of an RFID tag is detected within the coverage zone. At that point, the process would begin again for that detected person. However, if at block 325 it is determined that the detected wearer is authorized to use the device, the process moves to block 330 where the device is activated so that it may be used by that wearer.

Once the device has been activated for use by a detected wearer of an RFID tag, the access management system continues to monitor the coverage area for other RFID tags. Specifically, at block 335, it is determined whether a second RFID tag is detected in the coverage zone. If no second RFID tag is detected in the coverage zone, the process simply returns to block 330 where the electronic device is allowed to continue to operate for the originally authorized person. However, if a second RFID tag is detected in the coverage zone by the reader, the process moves to block 340 where the reader transmits the detected second unique identification information pulled from the second RFID tag back to the device management system. Once received by the device management system, the device management system determines, at decision block 345 whether the wearer of the detected second RFID tag is also authorized to use the electronic device. If the second wearer detected by the reader is not authorized to use the device, the process moves to bock 350 where the device is deactivated or otherwise prevented from operating for any person. The process would then end at block 355. However, if it determined that the second wearer is also authorized to use the device, the process moves again to block 330, where the device is allowed to continue to operate for both authorized users.

It is understood that the above process can be extended for any number of wearers of RFID tags, including embodiments such as the inmate telephone implementation discussed above where only one wearer is permitted use of the device at any time. For access to telephones, computers and the like, allowing access to only one authorized person at a time may be beneficial. In other embodiments, however, such as when the device is a television or a radio, the use by multiple authorized persons may be perfectly fine. In this latter case, the television, radio, movie theater projector, or other approved audience-based device may be allowed to operate to multiple wearers of RFID tags approved for such use. However, once the system detects even one unauthorized RFID tag, the device may be disconnected, temporarily paused, or even deactivated until the unauthorized person leaves the coverage zone.

Figure 4:
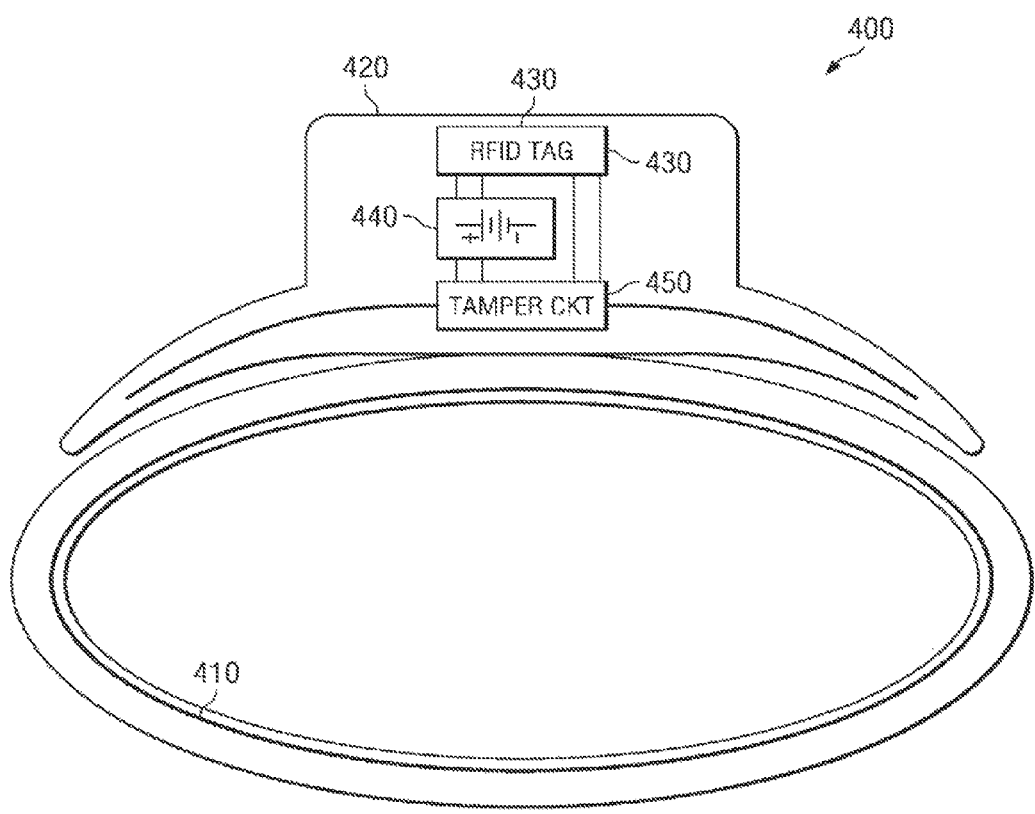
FIG. 4 illustrates one embodiment of an RFID tag embedded in an inmate bracelet 400 for use with a management system implemented in a correctional facility.

FIG. 4 illustrates one embodiment of a RFID tag embedded in an inmate bracelet 400 for use with a management system implemented in a correctional facility. In advantageous embodiments, the bracelet 400 may be made of semi-rigid, hardened plastic material that is resistant to sweat, electrical shock, impact, radiation, water and other elements. Of course, other advantageous materials may also be used to construct the bracelet 400.

The bracelet 400 includes a band 410 that is mounted on an inmate's wrist or ankle, and which cannot be removed by unauthorized persons. The bracelet 400 also includes a housing 420 for carrying and protecting components used with an implemented embodiment of the disclosed access management system. For example, the housing 420 holds an RFID tag 430 that can be detected by a reader associated with an electronic device, as discussed above. The RFID tag may be of the type commonly known and used in various industries, or may be of any type either now existing or later developed. The RFID tag is programmable with identification information unique to the wearer of the particular RFID tag, and may even be reprogrammable if the RFID tag will be used by a different wearer in the future.

The housing 420 may also house a battery 440 used to power the RFID tag 430. In such embodiments, the active RFID tag yields the unique identification information when an RF pulse inquiry is made by the RFID reader within the coverage zone. The battery 440 may be a thin-film battery technology employing a solid electrolyte between the anode and cathode elements. In such embodiments, the battery 440 may be made extremely small and lightweight for easier use when worn by an inmate. For example, the battery 440 may only be approximately 10 microns thick and inductively rechargeable up to 70,000 times. Of course, other battery technology is also within the scope of an access management system constructed as disclosed herein. In other embodiments, however, passive RFID tags may also be employed. In such embodiments, the RF pulse inquiry transmitted by the RFID reader may also provide the power signal needed by the passive RFID tag to transmit its unique identification information back to the reader.

Furthermore, in some embodiments, the housing 420 may also include tamper detection circuitry 450. Specifically, the RFID tag's 430 transmit function may be coupled to the tamper detection circuitry 450. In one embodiment, this tamper detection circuitry 450 can detect resistance changes in a fixed resistance conductor which extends around the entire circumference of the band 410. For example, a Wheatstone bridge arrangement may be used to detect strain, stretching or breaking of the band 410 by sensing a resistance/current change of enough magnitude to indicate that the inmate has tampered with or broken the band 410. Once triggered, the tamper detection circuitry 450 may cause the RFID tag 430 within the bracelet 400 to no longer respond to any query from any RFID reader. Consequently, if the RFID tag 430 cannot transmit its information, no access to the inmate telephone system would be granted.

While various embodiments of forming bonding pads on an IC chip according to the principles disclosed herein have been described above, it should be understood that they have been presented by way of example only, and not limitation.

Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. An access management system for preventing unauthorized persons from using an electronic communication device in a custodial facility, the system comprising:
   a RFID tag configurable to have unique identification information that can be associated with a wearer of the RFID tag, wherein the RFID tag is configured to be comprised in a non-removable item worn by the wearer;
   a reader configurable to be associated with the electronic communication device, the reader configurable to have a RFID coverage zone for detecting RFID tags within the coverage zone; and
   a call management system configurable to be connected to the reader and configurable to determine whether a wearer is authorized to use the electronic communication device based at least in part on an RFID tag's detected unique identification information;
   wherein the reader is configured to detect when the RFID tag is within the coverage zone, the call management system activating the electronic communication device if it determines the wearer is authorized to use the electronic communication device.

2. A system according to claim 1, wherein the custodial facility is a prison, jail, detention facility or correctional facility, and wherein the wearer is an inmate in the prison, jail, detention facility or correctional facility.

3. A system according to claim 1, wherein the unique identification information is permanently associated with the corresponding wearer at the time the wearer arrives at the custodial facility.

4. A system according to claim 1, wherein the unique identification information associated with the RFID tag is reprogrammable depending on a wearer of the RFID tag.

5. A system according to claim 1, wherein the call management system is further configured to issue a notification when an RFID tag associated with an unauthorized wearer is detected in the coverage zone.

6. A system according to claim 1, wherein the electronic communication device is an audiovisual device.

7. A system according to claim 1, wherein the electronic communication device comprises an access point, wherein the access point is configured to restrict access to a specified location to only an expressly authorized wearer.

8. A system according to claim 1, wherein the non-removable item comprises a semi-rigid, hardened plastic material.

9. A system according to claim 1, wherein the non-removable item comprises break or tamper detection circuitry.

10. A system according to claim 9, wherein the RFID tag in the non-removable item ceases to function if the tamper detection circuitry is triggered.

11. A method of preventing unauthorized persons from using an electronic communication device in a custodial facility, the method comprising:
   providing a RFID tag configurable to have unique identification information that can be associated with a wearer of the RFID tag, wherein the RFID tag is configurable to be comprised in a non-removable item worn by the wearer;
   creating an RFID coverage zone around the electronic communication device;
   detecting when the RFID tag is within the coverage zone;
   determining whether the wearer of the RFID tag is authorized to use the electronic communication device based at least in part on the detected unique identification information; and
   activating the electronic communication device for use by the wearer of the RFID tag if it is determined that the wearer of the RFID tag is authorized to use the electronic communication device while the detected RFID tag is in the coverage zone.

12. A method according to claim 11, wherein the custodial facility is a prison, jail, detention facility or correctional facility, and wherein the wearer is an inmates in the prison, jail, detention facility or correctional facility.

13. A method according to claim 11, further comprising permanently associating the unique identification information with the corresponding wearer at the time the wearer arrives at the custodial facility.

14. A method according to claim 11, wherein the unique identification information associated with the RFID tag is reprogrammable depending on a wearer of the RFID tag.

15. A method according to claim 11, further comprising issuing a notification when an RFID tag associated with an unauthorized wearer is detected in the coverage zone.

16. A method according to claim 11, wherein the electronic communication device is an audiovisual device.

17. A method according to claim 11, wherein the electronic communication device comprises an access point, wherein the access point is configured to restrict access to a specified location to only an expressly authorized wearer.

18. A method according to claim 11, wherein the non-removable item comprises a semi-rigid, hardened plastic material.

19. A method according to claim 11, wherein the non-removable item comprises break or tamper detection circuitry.

20. A method according to claim 19, wherein the RFID tag in the non-removable item ceases to function if the tamper detection circuitry is triggered.

* * * * *